United States Patent
Tseng et al.

(10) Patent No.: US 10,051,713 B1
(45) Date of Patent: Aug. 14, 2018

(54) METHOD FOR COMMAND TRANSMISSION AND CONFIGURATION TO SENSOR IMPLEMENTED BY AMBIENT LIGHT SOURCE

(71) Applicant: DELTA ELECTRONICS, INC., Taoyuan (TW)

(72) Inventors: Chao-Chun Tseng, Taoyuan (TW); Min-Nan Liao, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/711,553

(22) Filed: Sep. 21, 2017

(30) Foreign Application Priority Data

Apr. 20, 2017 (CN) .......................... 2017 1 0262220

(51) Int. Cl.
  *H05B 37/02* (2006.01)
  *H05B 37/03* (2006.01)
  *H05B 33/08* (2006.01)

(52) U.S. Cl.
  CPC ..... *H05B 37/0218* (2013.01); *H05B 37/0272* (2013.01); *H05B 37/034* (2013.01); *H05B 33/0854* (2013.01)

(58) Field of Classification Search
  CPC .................. H05B 33/0854; H05B 37/0218
  USPC .................................................. 315/149, 308
  See application file for complete search history.

(56) References Cited

U.S. PATENT DOCUMENTS

| 4,479,266 | A | 10/1984 | Eumurian et al. |
| 9,113,528 | B2* | 8/2015 | Bora .................. H05B 33/0863 |
| 9,432,210 | B2* | 8/2016 | Bhargava ................. H04Q 9/00 |
| 2003/0147646 | A1 | 8/2003 | Sakata et al. |
| 2008/0285979 | A1 | 11/2008 | Suzuki et al. |
| 2009/0026966 | A1 | 1/2009 | Budde et al. |
| 2017/0108236 | A1* | 4/2017 | Guan .................. F24F 11/0012 |

OTHER PUBLICATIONS

Office Action dated Mar. 9, 2018 from corresponding application No. TW 106113228.

* cited by examiner

*Primary Examiner* — Thuy Vinh Tran
(74) *Attorney, Agent, or Firm* — Hauptman Ham, LLP

(57) ABSTRACT

A method for command transmission and configuration to sensor implemented by ambient light source is disclosed and adopted by a sensor having a light-sensing unit. The sensor collects ambient light time series data through the light-sensing unit, and extracts valid brightness toggle data therefrom. Next, the sensor determines if the obtained brightness toggle data matches with a triggering condition of a pre-stored command. When the obtained brightness toggle data matches with the triggering condition, the sensor outputs a flashing signal through its display unit and further determines if receiving a confirmed brightness toggle data or not. When receiving the confirmed brightness toggle data within a waiting period after outputting the flashing signal, the sensor automatically performs the pre-stored command corresponding to the matched triggering condition.

19 Claims, 8 Drawing Sheets

METHOD FOR COMMAND TRANSMISSION AND CONFIGURATION TO SENSOR IMPLEMENTED BY AMBIENT LIGHT SOURCE

BACKGROUND

Technical Field

The present disclosure relates to a method for command transmission and configuration to sensor. More particularly, the present disclosure relates to a method for command transmission and configuration to sensor implemented by light source.

Description of Related Art

In order to reliably detect the environmental conditions in a space, and thus effectively and automatically control various equipment (such as air conditioning equipment, lighting equipment, etc.) in the space, many systems will be set in the space of a variety of sensors. The equipment is automatically controlled in accordance with sensing results of the sensors (for example, the lamp is turned off automatically when people leave the space, or the temperature of the air conditioner is automatically lowered when the temperature raises is sensed).

Reference is made to FIG. 1A, which is a schematic diagram of spatial arrangement of sensors of the related art. In FIG. 1A, many sensors, such as people detector (PD), temperature sensor, or humidity sensor, etc., of the same or different types are installed or configured in a space 1 to sense various parameters, thereby automatically controlling the equipment in the space.

Referring also to FIG. 1B, which is a schematic diagram of a sensor of the related art. In FIG. 1B, the sensor 2 is provided with one or more setting switches 21, for example, dip switches, push switches, etc., which are used for a user to do a manual input to operate the setting switch 21 so that the sensors 2 can be set (such as reset, updated frequency settings, and sensitivity settings).

In order to successfully sense the condition in the space 1, the sensors 2 are installed in the places where user is not easy accessible; it is necessary to climb a ladder to access the sensor while the user wants to set or reset the sensors 2; however, this leads to trouble for user.

Conventionally, in order to reduce the difficulty of setting or resetting, the manufactures usually configure remote control 2 to allow remote configuration of the sensor 2. In addition, in order to be compatible with the remote control 3, the sensors 2 is usually required to at least include an infrared, Bluetooth, and Wi-Fi wireless dedicated to wireless communication functions, so that the cost of the sensor 2 is increased. Furthermore, the user must pay an extra fee to purchase the remote control.

SUMMARY

According to one aspect of the present disclosure, a method for command transmission and configuration to sensor implemented by ambient light source is disclosed and adopted by a sensor having a light-sensing unit. The sensor collects ambient light time series data through the light-sensing unit, and extracts valid brightness toggle data therefrom. Next, the sensor determines if the obtained brightness toggle data matches with a triggering condition of a pre-stored command. When the obtained brightness toggle data matches with the triggering condition, the sensor outputs flashing signal through its display unit and further determines if receiving a confirm brightness toggle data or not. When receiving the confirm brightness toggle data within a waiting period after outputting the flashing signal, the sensor automatically performs the pre-stored command corresponding to the matched triggering condition.

BRIEF DESCRIPTION OF DRAWING

The present disclosure can be more fully understood by reading the following detailed description of the embodiment, with reference made to the accompanying drawings as follows.

DETAILED DESCRIPTION

A preferred embodiment of the present disclosure will be described with reference to the drawings.

Figure 1A:
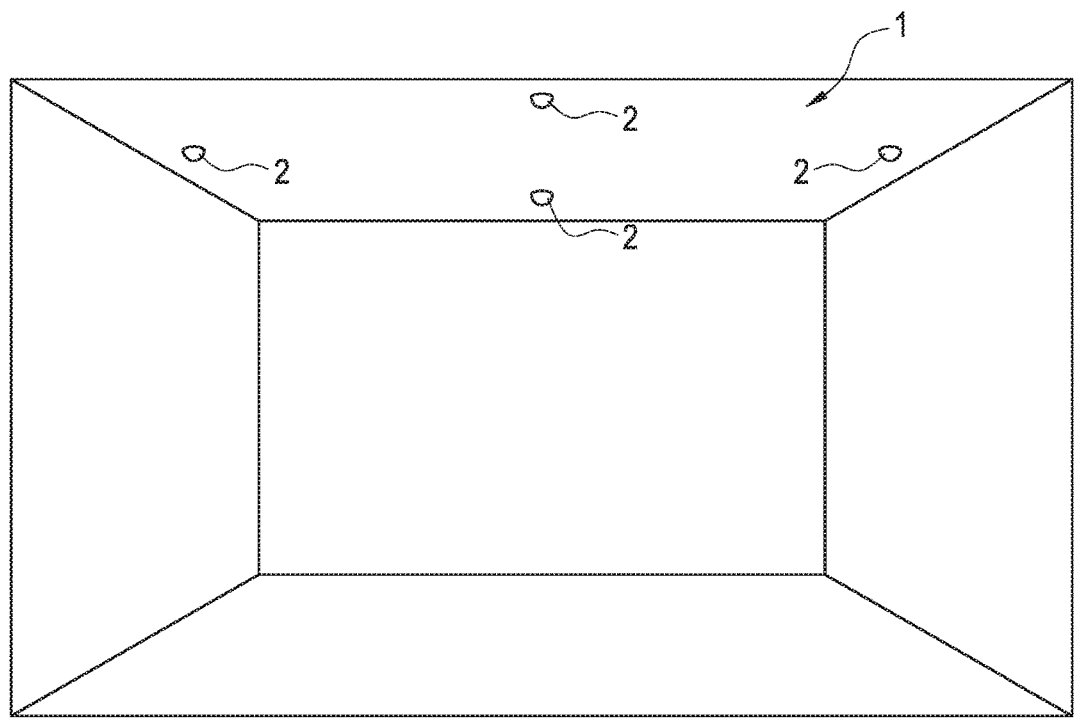
FIG. 1A is a schematic diagram of spatial arrangement of sensors of the related art.
Figure 1B:
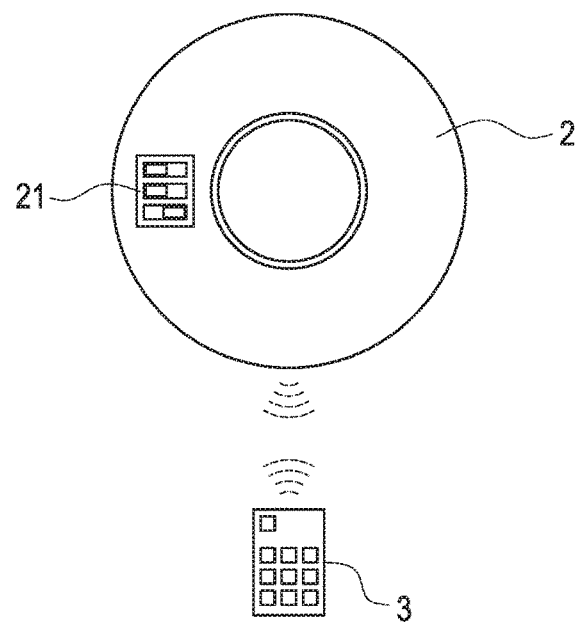
FIG. 1B is a schematic diagram of a sensor of the related art.

The present disclosure discloses a method for command transmission and configuration to sensor implemented by ambient light source (hereafter "the method"). The method is applied to many sensors (such as the sensors 2 shown in FIG. 1) having light-sensing units, and the sensors 2 can be setup through the commands generated by switching the ambient light source and transmitted thereto.

More particularly, instead of wireless communication function, the sensors 2 applied to the present disclosure capable of sensing ambient light source (i.e., the sensors 2 may sense brightness and darkness of the ambient light source). As a result, the user may switch the ambient light source (to be turn on or turn off the fluorescent lamps, the ceiling lamps, the desk lamps, or flash lights) for performing command transmission and configuration.

Figure 2:
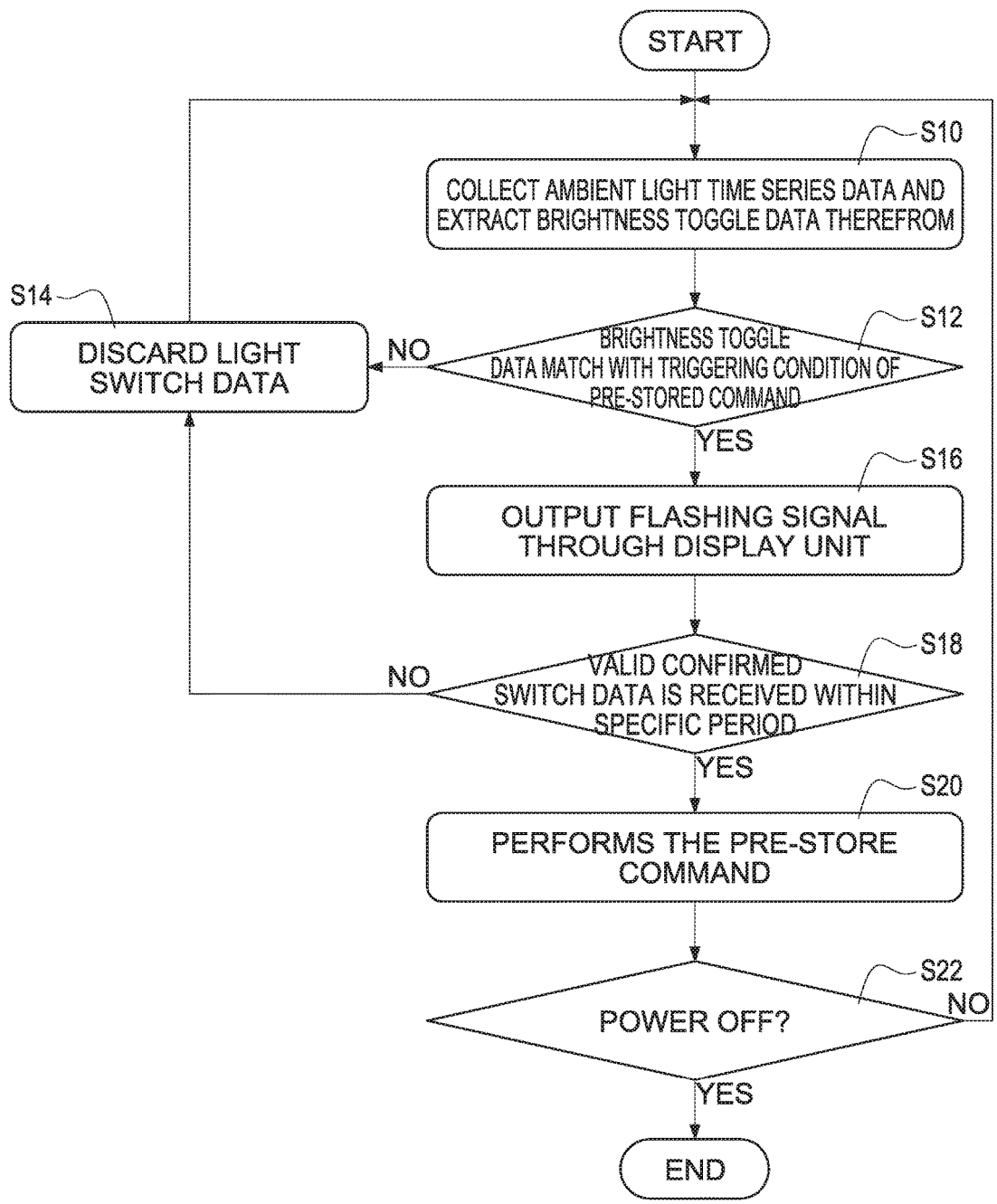
FIG. 2 is a flowchart of configuration the sensor according to the first embodiment of the present disclosure.
Figure 4:
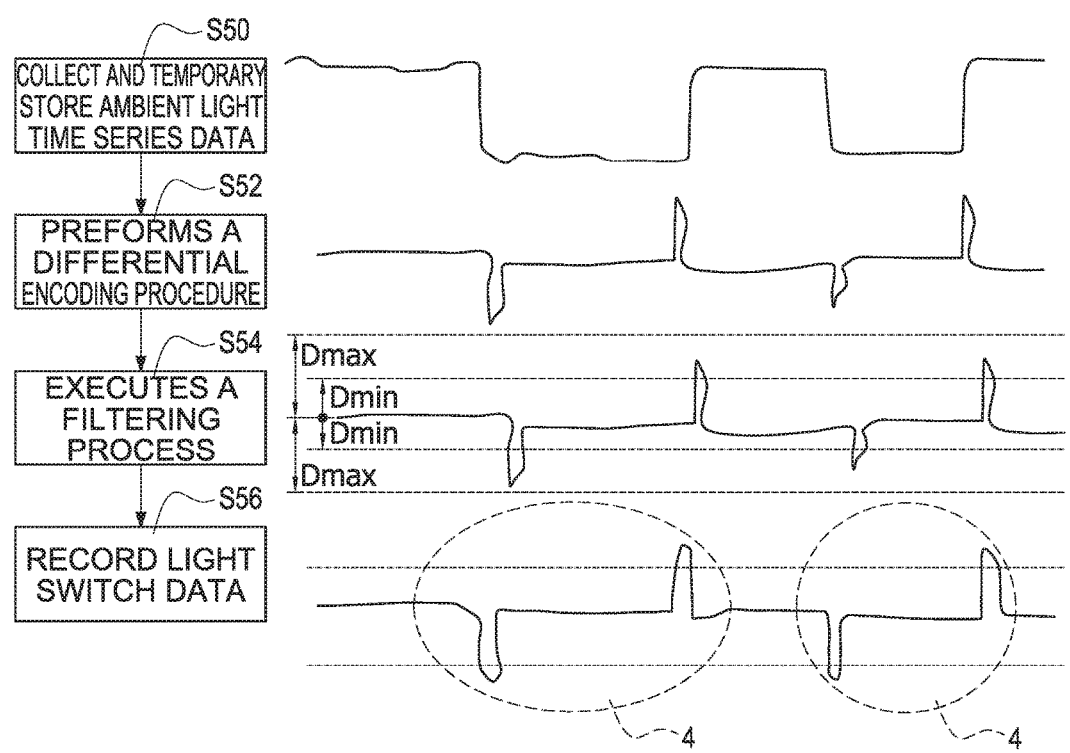
FIG. 4 is a diagram illustrating brightness toggle data analysis according to the first embodiment of the present disclosure.

Reference is made to FIG. 2, which is a flowchart of configuring the sensor according to the first embodiment of the present disclosure. In FIG. 2, the sensor 2 first collects ambient light time series data through the light-sensing unit and extracts valid brightness toggle data therefrom (step S10). In the embodiment, the ambient light time series data may be composed of a high-voltage differential signal (i.e., the ambient light source changes from dark to bright) and a low-voltage differential signal (i.e., the ambient light source changes from bright to dark) as shown in FIG. 4, which are described below.

Notably, the valid brightness toggle data may be sequentially composed of the high-voltage differential signal and the low-voltage differential signal (i.e., the ambient light changes from bright to dark); the valid brightness toggle data may also be sequentially composed of the low-voltage differential signal and the high-voltage differential signal (i.e., the ambient light changes from dark to bright), but not limited.

Specifically, in the embodiment, the sensor 2 extracts the valid brightness toggle data from the ambient light time series data temporarily stored in one or more buffers (not shown) for a temporary time (such as 3 or 5 seconds) and then analyzes the ambient light time series data temporarily stored in the buffers through internal algorithms. In detail, an updating frequency of the data temporarily stored in the buffers may be adjusted in accordance with a sampling frequency of the light-sensing unit, and is for example, every 100 ms, every 200 ms, etc., and the sensor 2 analyzes the ambient light time series data according to the updating frequency. Thereby the sensor 2 can successfully receive the ambient light time series data at what point in time the user switches the light source for command transmission.

After step S10, the sensor 2 determines if the brightness toggle data matches with a triggering condition of a pre-stored command via an internal processor (not shown) (step S12) and discarding the brightness toggle data if a mismatched between the brightness toggle data and the triggering condition is occurred (step S14) and then return to step S10 for analyzing the ambient light time series data in accordance with the updating frequency temporarily stored in the buffers.

When the brightness toggle data matches with the triggering condition, the sensor 2 outputs a flashing signal through its display unit (not shown) (step S16) for informing user that the command generated by switching ambient light source and transmitting to the sensor 2 has been successfully received by the sensor 2. In an embodiment, the display unit may be one or more light emitting diodes (LEDs), one or more light bulbs, or a display screen; the processor of the sensor 2 controls the display unit blinking.

In an embodiment, a number of times of blinking of the flashing signal is the same as a number of the brightness toggle data. User may further confirm whether the number of the brightness toggle data analyzed by the sensor 2 is correct or not.

Notably, the sensor 2 of the present disclosure may pre-store one or more pre-store commands. Each pre-store command corresponds to one triggering condition, and each triggering condition records a positive integer, such as 1, 2, 3, and 4 etc. In the aforementioned step S12, the sensor 2 merely determines that the brightness toggle data matches with the triggering condition corresponding to the pre-stored command when the set number of the brightness toggle data matches with the value recorded in one of the triggering conditions.

For example, when a value of a first pre-store command of the triggering condition is 3, a value of a second pre-store command of the trigger condition is 5, and the sensor 2 determines that the pre-store command is the first pre-store command when the user turn on and off the ambient light source for three times (i.e., the sensor 2 analyzes the ambient light time series data and generates three set of brightness toggle data).

After outputting the flashing signal, the sensor 2 further starts time counting for a specific period of time, and determines whether a valid confirmed brightness toggle data is received or not within the specific period (step S18). In the embodiment, the confirmed brightness toggle data corresponds to a set of confirming function determined by user himself/herself; the sensor 2 makes the brightness toggle data to be the confirm brightness toggle data when it receives a valid confirmed brightness toggle data in the specific period and determines that the function of the switch date matches with the pre-set confirm function.

Figure 8A:
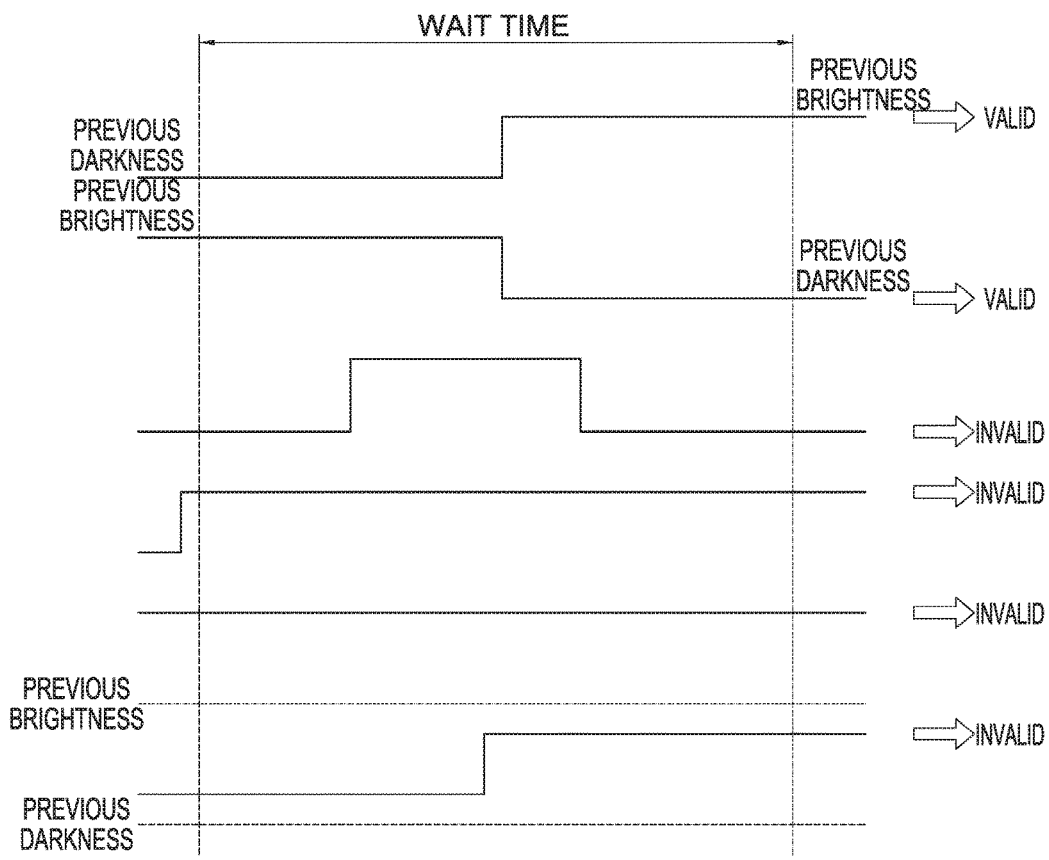
FIG. 8A is a diagram illustrating the confirm signal according to the first embodiment of the present disclosure.

Reference is made to FIG. 8A, which is a diagram illustrating the confirm signal according to the first embodiment of the present disclosure. In FIG. 8A, the user sets the confirmed function is in the form of a step function. As the first function shown in FIG. 8, the sensor 2 confirms that the ambient light is relatively dark, and a valid confirmed brightness toggle data is therefore determined when the high-voltage differential signal is sensed. In the other words, the differential signal of the valid confirmed brightness toggle data is the high-voltage differential signal.

As the second function shown in FIG. 8A, the sensor 2 confirms that the ambient light is relatively bright, and a valid confirm brightness toggle data is therefore determined when the low-voltage differential signal is sensed; in the other words, the differential signal of the valid confirm brightness toggle data is the low-voltage differential signal. The other functions shown in FIG. 8A go not match with the step function defined by the user, thus the sensor 2 does not treat the functions as the valid confirmed brightness toggle data.

The step function mentioned above is one of the confirm function in the present disclosure; in the other embodiment, the user may also define the confirmed brightness toggle data as other functions.

Figure 8B:
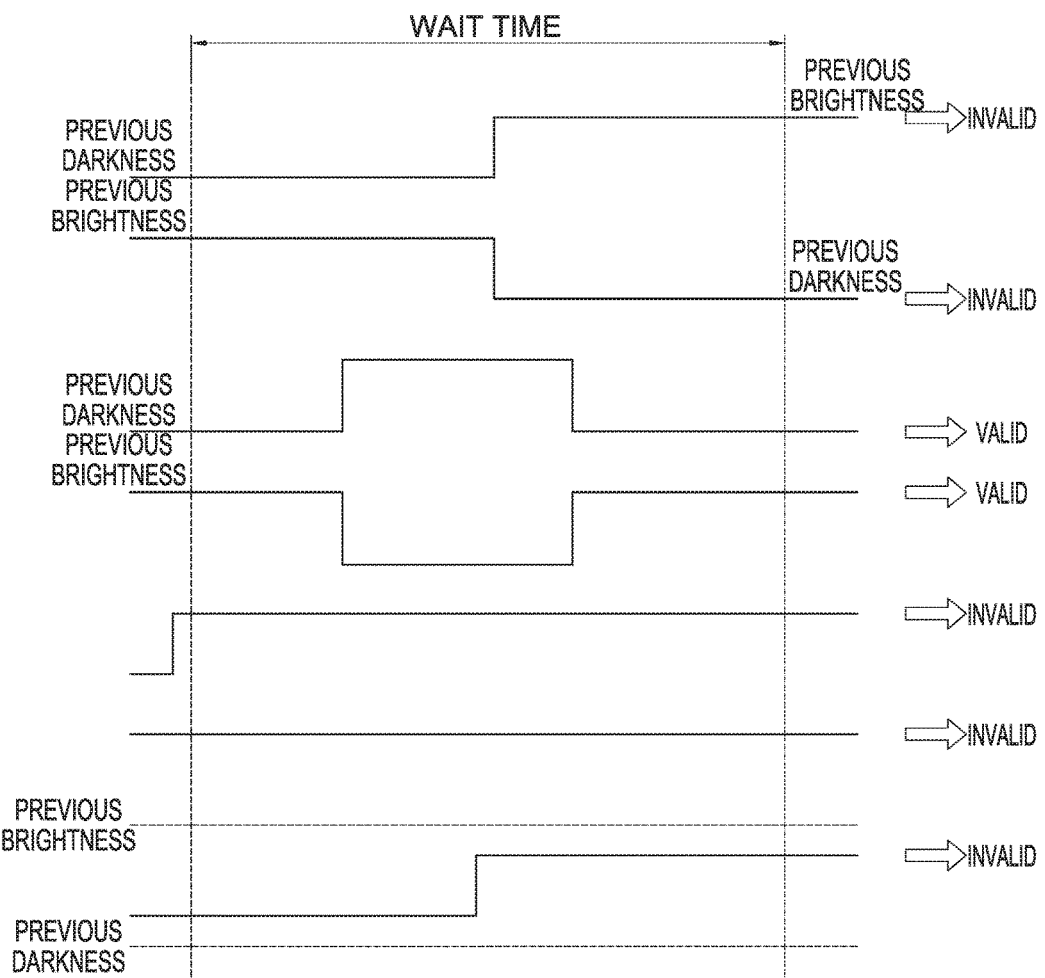
FIG. 8B is a diagram illustrating the confirm signal according to the second embodiment of the present disclosure.

Reference is made to FIG. 8B, which is a diagram illustrating the confirm signal according to the second embodiment of the present disclosure. In FIG. 8B, the confirm brightness toggle data defined by user is in the form of a rectangle function.

In the third function of FIG. 8B, if the sensor 2 confirms that the previous ambient light is relatively dark, and the sensor 2 determines that the obtained data is the valid confirmed brightness toggle data when sequentially senses the high-voltage differential signal and the low-voltage differential signal (i.e., the valid confirmed brightness toggle data is composed of the high-voltage differential signal and a low-voltage differential signal follows the high-voltage differential signal).

In the fourth function in FIG. 8, if the sensor 2 confirms that the previous ambient light is relatively bright, and the sensor 2 determines that the obtained data is the valid confirmed brightness toggle data when sequentially senses the low-voltage differential signal and the high-voltage differential signal (i.e., the valid confirm brightness toggle data is composed of the low-voltage differential signal and the high-voltage differential signal follows the low-voltage differential signal). The other functions shown in FIG. 8B go not match with the step function defined by user, thus the sensor 2 does not treat the functions as the valid confirmed brightness toggle data.

The sensor 2 discards the brightness toggle data (step S14) when the confirmed brightness toggle data is not received within the specific period of time or the received data is not the valid confirmed data, and then return to step S10 for analyzing the ambient light time series data in accordance with the updating frequency again.

The sensor 2 performs the pre-store command corresponding to the brightness toggle data by the processor when successfully receives the valid confirmed brightness toggle data (step S20). In an embodiment, the pre-store command may be a reset command, a delay time setup command, sensitivity adjusting command, or so on, but not limited.

After step S20, the sensor 2 further determines that it is in a power-off state. When the sensor 2 is determined in the power-off state, ends the configuration method, and repeatedly performs the steps S10 to S20 before the sensor 2 being in the power-off state for continually collecting the ambient light time series data and determines whether the user transmits the command by switching the ambient light source.

Figure 3:
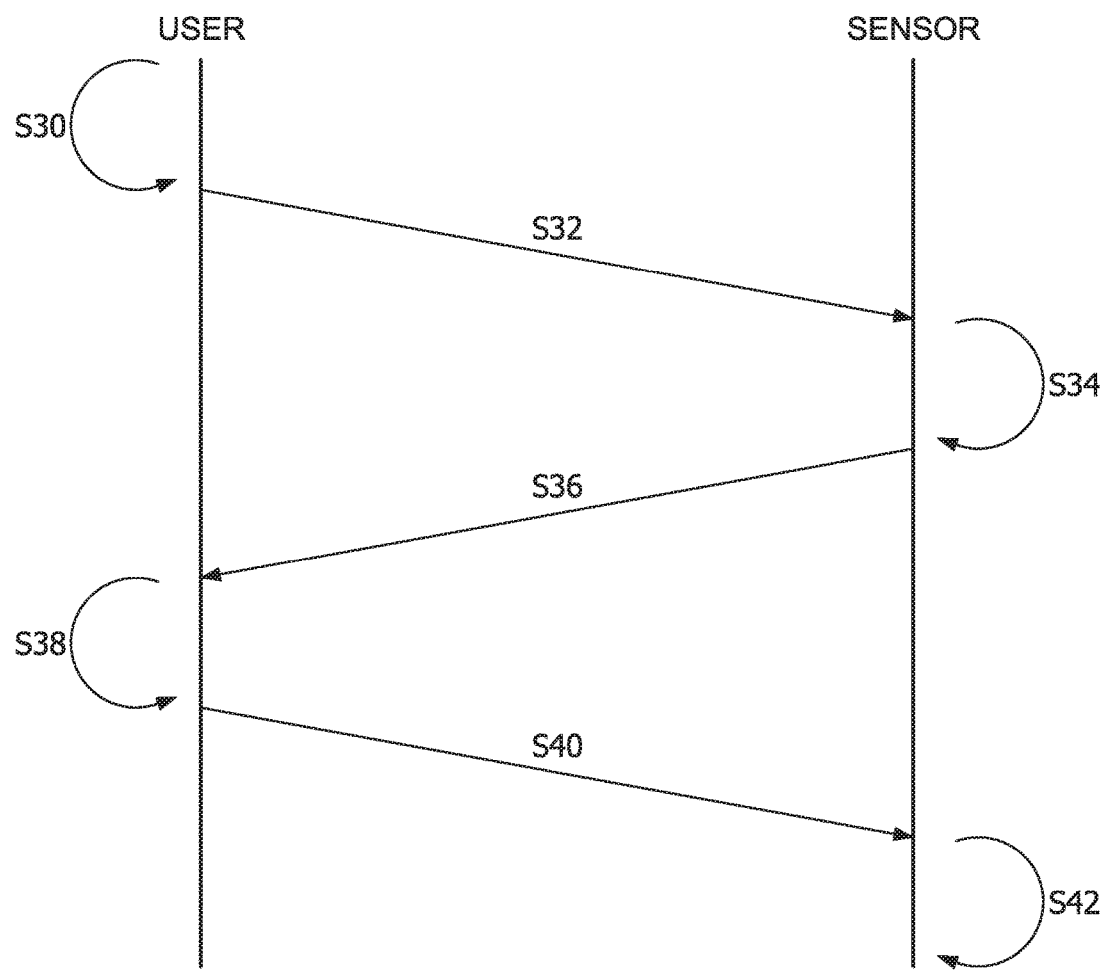
FIG. 3 is an operation timing diagram according to the first embodiment of the present disclosure.

Referring also to FIG. 3, which is an operation timing diagram according to the first embodiment of the present disclosure. FIG. 3 is the diagram for further explaining how the user transmits the command to the sensor 2 by switching the ambient light source. In FIG. 3, the user first alternatively turns on and off the ambient light source (such as fluorescent lamps or reading lamps) (step S30) for transmitting light commands outward (step S32).

In the embodiment, when the ambient light is initial on so that user turns off the ambient light and then turn on the ambient light is treat as a cycle (corresponding to a set brightness toggle data); when the ambient light is initial off and a cycle is beginning from the user turns on the ambient light and then turns off the ambient light. In the other words, when user turns on and off the ambient light for 5 times, the light command includes five sets of brightness toggle data.

The sensor 2 receives the light command through its light-sensing unit and analyzes the light command into pre-store command after the light command is emitted (step S34). The sensor 2 further outputs the flashing signal (step S36) as feedback signal (ACK) through the display unit.

The user may determine whether the light command is correct or not in accordance with the flashing signal (step S38) thereafter. In an embodiment, the user may determine whether the number of times of blinking of the flashing signal is the same as the number of the brightness toggle data to determine that the light command is correct. In addition, if the number of the times of blinking of the flashing signal is determined to be correct by user, the user may further turn on/off the ambient light for transmitting confirm command (step S40).

After step S36, the sensor 2 starts time counting for a specific period of time. If the confirm command is received within the specific period of time, the sensor 2 further performs the pre-store command corresponding to the light command (step S42).

With the configuration method of the present invention, it is convenient for the user to easily configure the remote sensor 2 without touching the sensor 2 and purchasing the infrared remote control or the Bluetooth remote control.

Reference is made to FIG. 4, which a diagram illustrating brightness toggle data analysis according to the first embodiment of the present disclosure. FIG. 4 is a diagram for explaining how the time series data is subjected to processing in step S10 of FIG. 2 to obtain one or more sets of brightness toggle data.

First, the sensor 2 collects ambient light time series data through the light-sensing unit and temporary stores the ambient light time series data in the buffers (step 50). As shown in FIG. 4, the ambient light time series data includes a light wave change that is collected and temporarily stored by the buffer during the temporary storage time.

Thereafter, the sensor 2 executes a differential encoding procedure to the ambient light time series data through the processor to obtain a plurality of high-voltage differential signals and a plurality of low-voltage differential signals (step S52). More particularly, each high-voltage differential signal corresponds to an ambient light source turning on operation (i.e., the ambient light source changes from dark to bright) and each low-voltage differential signal corresponding to an ambient light source turning off operation (i.e., the ambient light source changes from bright to dark).

Thereafter, the sensor 2 executes a filtering process for the high-voltage differential signals and the low-voltage differential signals (step S54).

Specifically, the sensor 2 records a maximum difference (Dmax) and a minimum difference (Dmin). In FIG. 4, the filtering procedure determines intensities of the high-voltage differential signals and the low-voltage differential signals, and selects the high-voltage differential signals and the low-voltage differential signals whose intensities are between the maximum difference and a minimum difference.

Afterwards, the sensor 2 records one of the high-voltage differential signals and adjacent low-voltage differential signal been filtered as a set of brightness toggle data 4 (step S56). In FIG. 4, the brightness toggle data do not overlap with each other; namely, the brightness toggle data 4 does not include the same high-voltage signal or low-voltage signal.

After step S56, the sensor 2 extracts many sets of brightness toggle data 4 from the ambient light time series data and specifies which pre-store command corresponds to the user's operation in accordance with the brightness toggle data 4.

Figure 5:
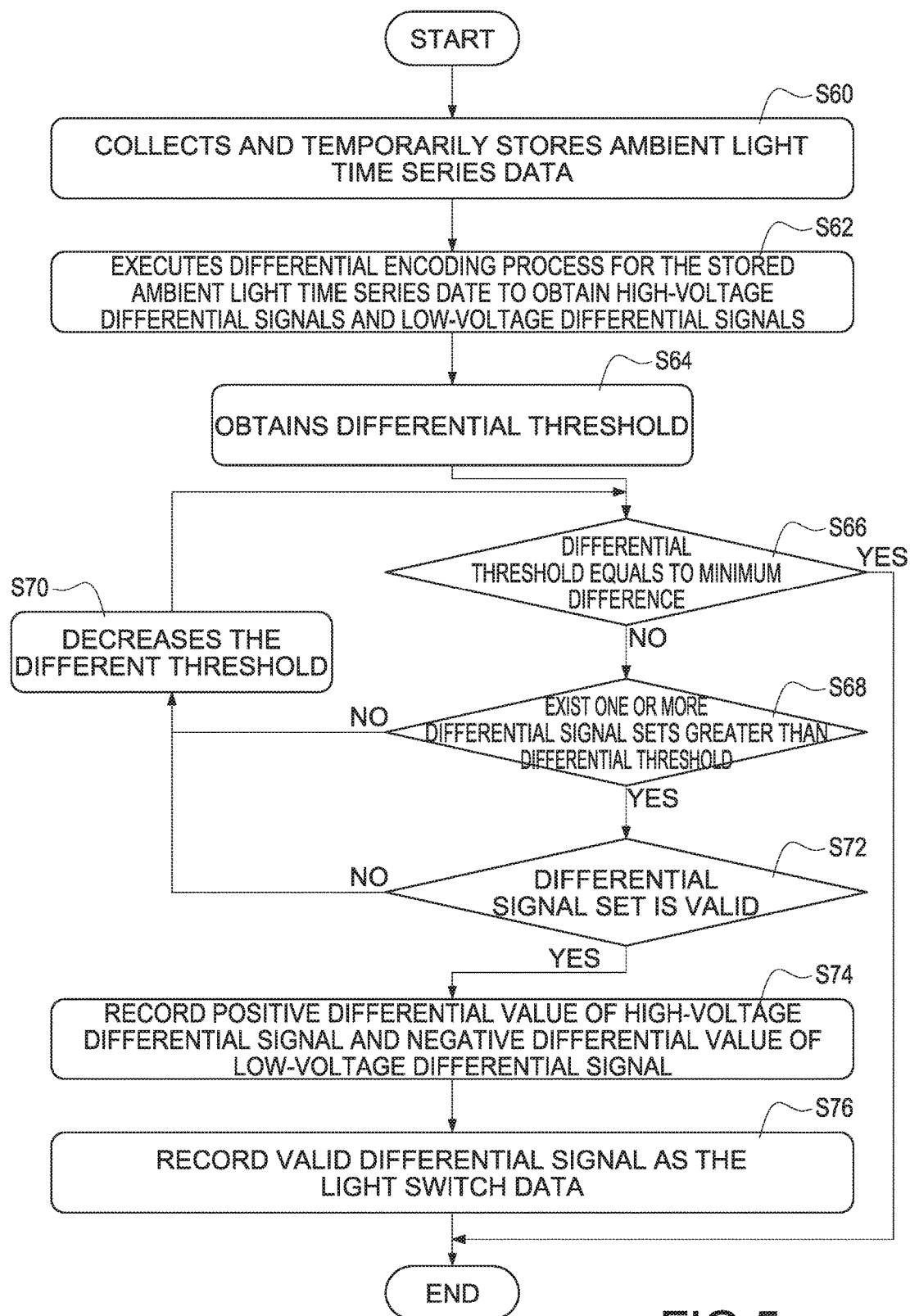
FIG. 5 is a flow chart of analyzing the brightness toggle data according to the first embodiment of the present disclosure.

Reference is made to FIG. 5, which is a flow chart of analyzing the toggle data according to the first embodiment of the present disclosure. FIG. 5 is a diagram for explaining how the above-described step S10 of FIG. 2 performs the analysis processing on the time series data.

In FIG. 5; the sensor 2 first collects and temporarily stores the ambient light time series data (step S60). Afterwards, the sensor 2 executes the differential encoding process for the stored ambient light time series date to obtain the high-voltage differential signals and the low-voltage differential signals (step S62).

Thereafter, the sensor 2 obtains a differential threshold (step S64), and determines that the differential threshold is the minimum difference (step S66). More particularly, the differential threshold is a predetermined maximum difference obtained by the sensor 2 in step S64.

When the differential threshold is not equal to the minimum difference, the sensor 2 determines whether one or more differential signal sets greater than the differential threshold are existed in the high-voltage differential signals and the low-voltage differential signals or not (step S68); each differential signal set is composed of one high-voltage differential signal and one low-voltage differential signal adjacent to the high-voltage differential signal.

The sensor 2 further determines that each differential signal set is valid or not while determined the differential signal sets being over the differential threshold or not (step S72).

In FIG. 5, the sensor 2 decreases the different threshold when the sensor 2 does not determine whether the differential signal sets being over the differential threshold in step S68 (step S70) and return to the step S66 for determining the differential threshold is equal to the minimum differential or not, and determined the decreased differential threshold is greater than the differential signal sets or not while the decreased differential threshold is not equal to the minimum differential.

In addition, the sensor 2 may decrease the differential threshold when the differential signal sets are invalid (step S70), and then returns to step S66 for further determining the decreased differential threshold.

Figure 6:
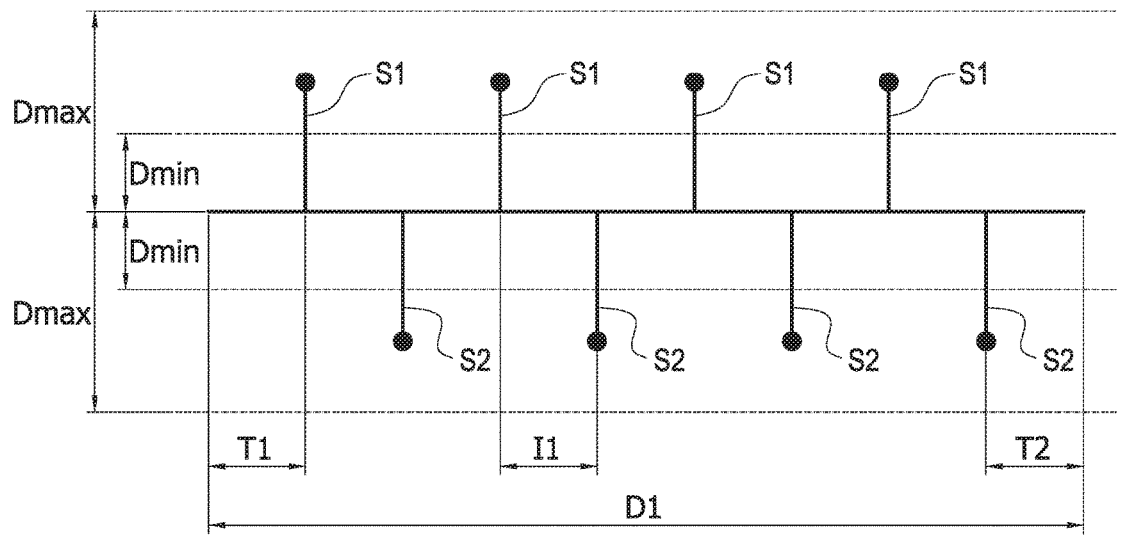
FIG. 6 is a diagram illustrating signal process according to the first embodiment of the present disclosure.

Referring also to FIG. 6, which is a diagram illustrating signal process according to the first embodiment of the present disclosure. In the embodiment, the maximum difference (Dmax) may be the maximum brightness or maximum darkness sensible by the light-sensing unit, and the minimum difference (Dmin) is defined by an absolute minimum of a differential signal that identifies the ambient light source changes from bright to dark or from dark to bright.

In FIG. 6, the sensor 2 analyzes the time series data D1 temporarily stored therein for extracting the high-voltage difference signals S1 and the low-voltage difference signals S2. Thereafter, determining whether one or more differential signal sets whose intensities exceed the differential threshold is existed or not from the maximum different (i.e., the maximum differential is the differential threshold). The sensor 2 then lower the differential threshold if one or more differential signal sets whose intensity exceeds the differential are not found and then determines whether one or more differential signal sets whose intensity exceeds the differential threshold is existed or not until the differential threshold equals to the minimum differential.

The sensor 2 further determines whether one or more differential signal sets are valid if the intensity of one or more differential signal sets exceeds the difference threshold before the differential threshold equals to the minimum differential (i.e., the step S72 shown in FIG. 5).

In FIG. 6, a time interval I1 is between two adjacent differential signals, and the time interval I1 which user switches the ambient light on/off. In an embodiment, the sensor 2 determines whether one or more differential signal sets are valid when the time interval I1 between each high-voltage differential signal S1 and the low-voltage differential signal S2 is in a stable state. More particularly, the sensor 2 determines the time intervals I1 are in the stable state while the time intervals I1 in the time series data D1 temporarily stored are the same or similar.

Figure 7A:
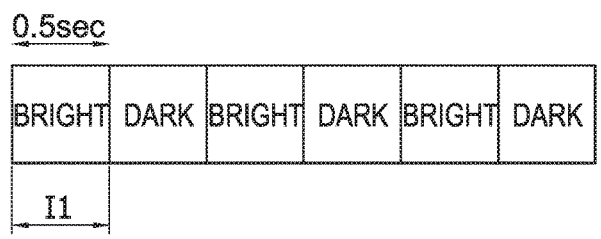
FIG. 7A is a diagram illustrating operation intervals according to the first embodiment of the present disclosure.
Figure 7B:
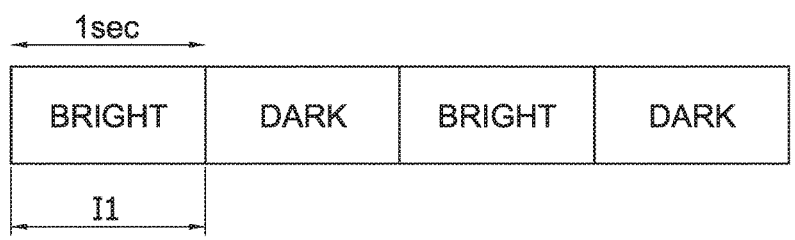
FIG. 7B is a diagram illustrating operation intervals according to the second embodiment of the present disclosure.

In another embodiment, the sensor 2 determines whether one or more differential signal sets are valid when the time interval I1 of the time series data D1 temporarily stored are greater than a minimum interval and lower than a maximum internal/FIG. 7A and FIG. 7B are diagrams illustrating operation intervals according to the first and second embodiment of the present disclosure. In FIG. 7A and FIG. 7B, the time interval I1 is the time interval which user turn on/off the ambient light source. In the other words, the time interval I1 is the internal that the sensor 2 senses the ambient light changes from bright to dark or from dark to bright.

In the embodiment shown in FIG. 7A, the time interval of the ambient light source changes from bright to dark is 0.5 seconds (i.e., the ambient light source turns on for 0.5 seconds and the time interval I1 is 0.5 seconds), and the time interval of the ambient light source changes from dark to bright is 0.5 seconds (i.e., the ambient light source turns off for 0.5 seconds and the time interval I1 is 0.5 seconds). In the embodiment shown in FIG. 7B, the time interval of the ambient light source changes from bright to dark is 1 second (i.e., the ambient light source turns on for 1 second and the time interval I1 is 1 second), and the time interval of the ambient light source changes from dark to bright is 1 second (i.e., the ambient light source turns off for 0 second and the time interval I1 is 1 second).

By the configuration method of the present disclosure, the user can complete the switching operation of the ambient light source in the temporary time supported by the buffers of the sensor 2 and stabilizes the time interval I1 to transmit the optical command to the sensor 2. Therefore, each user can use different time intervals to switch the ambient light source, effectively improving the use of the invention flexibility.

With referring again to FIG. 6; the time series data D1 temporarily stored by the sensor 2 further includes a setup time T1 and a sleep time T2 after the last differential signal. In another embodiment, the sensor 2 determines that one or more differential signal sets are valid when the setup time T1 is longer than a predetermined threshold setup time and the sleep time T2 is longer than a predetermined sleep time.

With referring again to FIG. 5; the sensor 2 may record the valid differential signal sets as the brightness toggle data when one or more differential signal sets are determined as valid differential signal sets in step S72 (step S76). As can be seen in FIG. 4 and FIG. 6, the brightness toggle data do not overlap with each other (i.e., the brightness toggle data do not include the same high-voltage differential signal S1 or the same low-voltage differential signal S2).

In the embodiment, the sensor 2 may further record one or more positive differential value of the high-voltage differential signal and one or more negative differential value of the low-voltage differential signal in the differential signal sets. Thereby, it is advantageous for the sensor 2 to determine whether or not the data is generated by the user and to effectively confirm the brightness toggle data when the subsequent data is received.

With referring again to FIG. 8A and FIG. 8B; as aforementioned, the sensor 2 may start time counting for the specific period of time after generating the flashing signal, and performs the pre-store data corresponding to the brightness toggle data if the valid confirm brightness toggle data is received.

The confirm brightness toggle data can be determined by user himself/herself, and the confirm brightness toggle data may be a confirm high-voltage differential signal (in the form of a step function), a confirm high-voltage differential signal (in the form of the step function), or a composition of a high-voltage differential signal and a low-voltage differential signal (in the form of a rectangle function), but not limited. However, the above-mentioned on or off switching operation is only a specific embodiment, and the user can set the sensor 2 as required, and the number of the switching operations is not limited to one time.

As aforementioned, the sensor 2 may records the positive differential value of the high-voltage differential signals and the negative differential value of the low-voltage differential signals of differential signal sets. In an embodiment, the sensor 2 may determines that the confirm brightness toggle data is valid when the positive differential value of the confirmed high-voltage differential signal is the same or similar to the positive differential value of the recorded high-voltage differential signals or the negative differential value of the confirmed low-voltage differential signal is the same or similar to the negative differential value of the recorded low-voltage differential signals.

In addition, the sensor 2 determines the confirm brightness toggle data are valid when the switching operation times is different from the predetermined switching operation times, the switching operation times is earlier than the confirm period, user does not perform the switching operation in the confirm period, the positive differential value of the confirmed high-voltage differential signal is different from the positive differential value of the high-voltage differential signal recorded by the sensor 2, or the negative differential value of the confirmed low-voltage differential signal is different from the negative differential value of the low-voltage differential signal recorded by the sensor s2.

With the configuration method of the present invention, the user can setup the sensor by switching ambient light but additional wireless remote control, and the sensor does not install with any communication unit. The manufacture and maintenance costs of the sensor can be lowered.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. A method for command transmission and configuration to sensor implemented by ambient light source adopted by a sensor having a light-sensing unit, the method comprising steps of:
    (a) collecting ambient light time series data through the light-sensing unit, and extracting valid brightness toggle data from the ambient light time series data;
    (b) determining if the brightness toggle data matches with a triggering condition of a pre-stored command;
    (c) outputting a flashing signal through a display unit when the brightness toggle data matches with the triggering condition;
    (d) determining if receiving a confirmed brightness toggle data or not after step c; and
    (e) performing the pre-stored command corresponding to the matched triggering condition when receiving the confirmed brightness toggle data within a waiting period after outputting the flashing signal.

2. The method in claim 1, further comprising a step of:
    (b1) discarding the brightness toggle data if the brightness toggle data and the triggering condition is mismatched.

3. The method in claim 1, further comprising a step of:
    (d1) discarding the brightness toggle data if the confirmed brightness toggle data are not received within the waiting period.

4. The method in claim 1, wherein each brightness toggle datum is composed of a high-voltage differential signal and a low-voltage differential signal adjacent to the high-voltage differential signal, and the confirmed switch datum is a confirmed high-voltage differential signal or a confirmed low-voltage differential signal.

5. The method in claim 4, wherein a number of times of blinking of the flashing signal is the same as a number of the brightness toggle data.

6. The method in claim 4, wherein in the step (b), determining if the brightness toggle data matches with triggering condition of the pre-stored command when a number of the brightness toggle data equals to a value recorded in the triggering condition.

7. The method in claim 4, wherein the step (a) further comprises steps of:
    (a01) collecting and temporarily storing the ambient light time series data;
    (a02) executing a differential encoding process for the stored ambient light time series date to obtain the high-voltage differential signals and the low-voltage differential signals;
    (a03) executing a filtering process for the high-voltage differential signals and the low-voltage differential signals; and
    (a04) sequentially selecting one of the filtered high-voltage differential signals and one of the filtered low-voltage differential signals adjacent to the selected high-voltage differential signal, and setting the selected high-voltage differential signal and the selected low-voltage differential signal as a set of the brightness toggle data, wherein the brightness toggle data do not overlap.

8. The method in claim 7, wherein the sensor records a maximum difference and a minimum difference, and the filtering process is executed to keep the high-voltage differential signals and the low-voltage differential signals whose intensities are between the maximum difference and the minimum difference.

9. The method in claim 8, wherein the maximum difference is defined by the maximum brightness or maximum darkness sensible by the light-sensing unit, and the minimum difference is defined by the minimum brightness or minimum darkness sensible by the light-sensing unit.

10. The method in claim 4, wherein the step (a) further comprises steps of:
    (a11) collecting and temporarily storing the ambient light time series data;
    (a12) executing a differential encoding process for the temporarily stored ambient light time series date to obtain the high-voltage differential signals and the low-voltage differential signals;
    (a13) obtaining a difference threshold;
    (a14) determining whether one or more differential signal sets have exceeded the differential threshold when the different threshold is not equal to the minimum differential, wherein each differential signal set comprises a high-voltage differential signal and adjacent low-voltage differential signal;
    (a15) determining whether each of the different signal sets is valid when the there are many differential signal sets have exceeded the differential threshold; and
    (a16) recording the differential signal sets as the brightness toggle data when the differential signal sets are valid, wherein the brightness toggle data do not overlap.

11. The method in claim 10, further comprising a step of:
    (a141) decreasing the differential threshold when the differential signal sets do not exceed the differential threshold and performing the step (a14) again.

12. The method in claim 10, further comprising a step of:
    (a151) decreasing the differential threshold when the differential signal sets are invalid and performing the step (a14) again.

13. The method in claim 10, wherein in the step (a13), obtaining a maximum difference as the differential threshold.

14. The method in claim 13, wherein the maximum difference is defined by the maximum brightness or maximum darkness sensible by the light-sensing unit, and the minimum difference is defined by an absolute minimum of a differential signal that identifies the ambient light source changes from bright to dark or from dark to bright.

15. The method in claim 10, further comprising a step of:
(a17) recoding positive differential values of the high-voltage differential signals and negative differential values of the low-differential signals of the differential signal sets.

16. The method in claim 15, wherein a positive differential value of the confirmed high-voltage differential signal is the same as or similar to the positive differential value of the high-voltage differential signal of the differential signal sets or a negative differential value of the conformed low-voltage differential signal is the same as or similar to the negative differential value of the low-voltage differential signal of the differential signal sets.

17. The method in claim 10, wherein in the step (a15), determining whether the differential signal sets are valid within a time interval between each high-voltage differential signal and adjacent low-voltage differential signal being in a stable state.

18. The method in claim 10, wherein in the step (a15), determining whether the differential signal sets are valid within a time interval between the high-voltage differential signal and adjacent low-voltage differential signal being longer than a minimum time interval and shorter than a maximum time interval.

19. The method in claim 10, wherein the ambient light time series data further comprises a setup time before the primary differential signal and a sleep time after the last differential signal, and in the step (a15), determining the differential signal sets are valid when the setup time is longer than a predetermined setup time and the sleep time is longer than a predetermined sleep time.

\* \* \* \* \*